May 7, 1940. H. KONIKOFF 2,200,114

COMBINED LAMP AND MIRROR STRUCTURES

Filed July 22, 1939

INVENTOR.
Harry Konikoff

BY John P. Chandler
his ATTORNEY.

Patented May 7, 1940

2,200,114

UNITED STATES PATENT OFFICE 2,200,114

COMBINED LAMP AND MIRROR STRUCTURES

Harry Konikoff, Far Rockaway, N. Y.

Application July 22, 1939, Serial No. 285,977

2 Claims. (Cl. 240—4.2)

This invention relates to new and useful improvements in combined lamp and mirror structures and relates more particularly to a type of improved combination lighting mirror including a concave reflector structure or housing within which a lamp is positioned, a mirror of smaller diameter than the open end of the housing being disposed substantially on the same plane as such open end of the housing. One of the principal objects of the present invention is to provide a device of this character having novel means for pivotally supporting the mirror structure.

A further object of the invention is to provide an improved combination mirror and lamp wherein the mirror structure is formed with a plurality of mirrors positioned back to back within a suitable annular supporting frame, one of the mirrors being plain and the other being preferably of the concave or reflecting type. The supporting means for this mirror structure are so arranged as to permit either mirror surface to face outwardly in the direction of the user, and in the event that it is desired to change mirror surfaces, the mirror supporting means may be quickly reversed without detaching any parts.

Yet another object of the invention is the provision of an improved supporting means for a mirror structure of this character wherein the mirror may be moved through an arc out of such open end of the housing in order to permit the lamp to be changed when desired.

Yet another object of the invention is to provide a combined lamp and mirror structure having a double faced mirror structure wherein the inner mirror serves as a reflector to considerably increase the amount of light passing outwardly through the annular opening between the external periphery of such mirror structure and the open end of the housing.

A further object of the invention is the provision of an improved means for pivotally mounting the housing or reflector on a base.

In the drawing, Fig. 1 is a front elevation of the preferred embodiment of the present invention;

Figure 4:
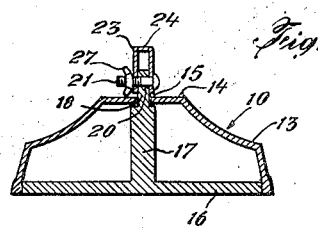
Fig. 4 is a central vertical section taken through the base structure.

Referring now more particularly to the drawing, the preferred embodiment of the present invention includes a base structure 10 and a reflector 11 pivotally mounted thereon. This base structure preferably includes a hollow shell 13 which is stamped or spun from flat material, such shell having inwardly inclined side walls and a top wall 14 having a substantially rectangular aperture 15 therein. This structure further includes a circular base member 16 having an integrally formed upstanding post 17 in the center thereof and an extension portion 18 at the upper end, such latter portion being substantially rectangular in horizontal section. This base member 16, together with the upstanding portions 17 and 18, is desirably cast from iron or other suitable metal and the external periphery of such member 16 is of such dimensions as to relatively closely fit within the shell 13 at the lower end thereof, all as clearly shown in Fig. 4. If desired, a piece of felt or other resilient material may cover the lower surface of this member 16 although such covering is not illustrated in the drawing.

Figure 1:
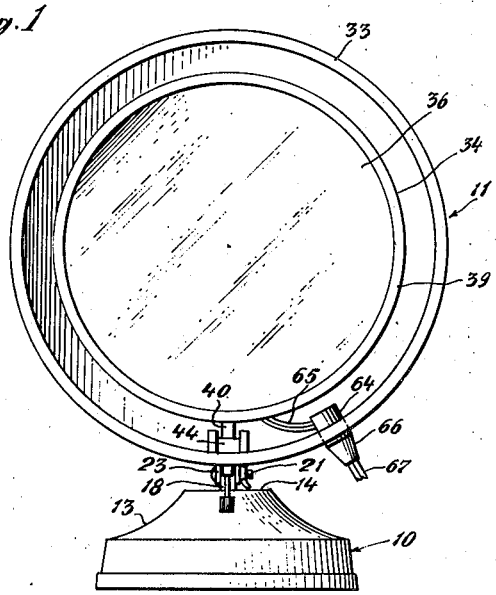
Figure 2:
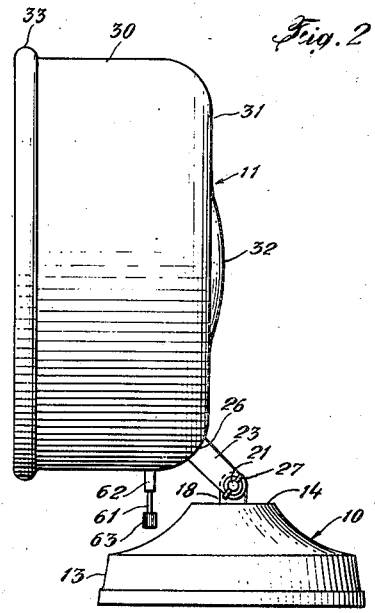
Fig. 2 is a side elevation thereof.
Figure 3:
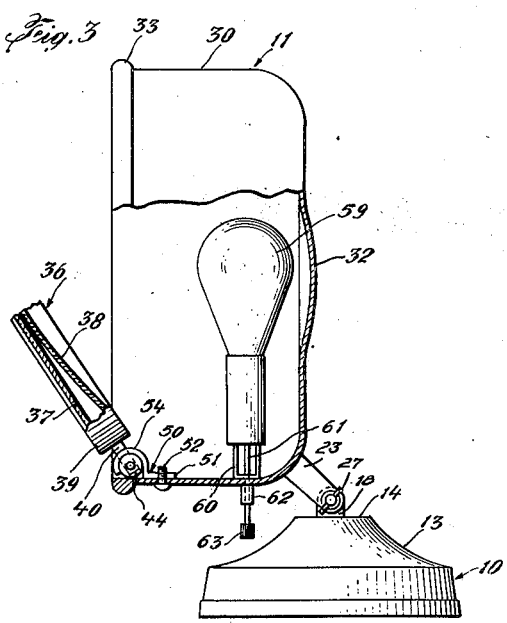
Fig. 3 is a side elevation partially in section, the view showing the mirror swung forward on its pivot preparatory to reversing the face thereof.

The upper terminal 18 is provided with a horizontal aperture 20 through which a threaded pin 21 passes and a substantially U-shaped reflector supporting member 23 is pivotally carried upon such pin, the upper surface 24 of such U-shaped supporting member being welded or otherwise secured to one corner of the reflector, as shown at 26 in Figs. 2 and 3. Thus the reflector may be positioned at any desired angle relative to the base and such reflector is secured in this desired position by means of a wing nut 27. The reflector is substantially cylindrical in shape and is provided with annular side walls 30, a rear wall 31 having an outwardly extending portion 32, and a beading 33 around the front or open end thereof.

Figure 5:
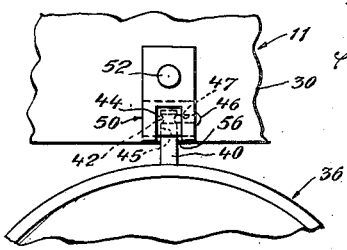
Fig. 5 is a broken plan view of a portion of the interior of the reflector and a portion of the mirror in substantially horizontal position.

The double mirror 36 structure comprises a plain circular mirror 37 and a concave or magnifying mirror 38, both of which mirrors are mounted back to back in a suitable frame 39. At the lower end of this frame a downwardly projecting pin 40 is rigidly secured and the following means are provided for permitting movement of the mirror structure on two planes. The pin is formed with an annular recess 42 at the lower end thereof, all as shown in Fig. 5. A short circular stud 44 is formed with a radially disposed aperture 45 therein within which the lower end of the pin 40 resides and a set screw 46 positioned in a threaded aperture 47 in this stud engages such annular recess 42 in the stud at its inner end. Thus it will be apparent that the mirror may be rotated upon the axis of the pin 40, thus permitting either mirror surface to be turned outwardly. The stud 44 is mounted for rotative movement by means of a journal member 50 which is formed from an elongated strip of flat sheet metal and is provided with a base portion 51 secured to the upper surface of the lower edge of the reflector by means of a screw 52. The opposite end of this member is curved at 54 as shown in Fig. 3, the internal surface of such portion being such as to closely fit around the periphery of the stud 44. This portion of the member 50 is further formed with a longitudinal recess 56 extending inwardly from the outer end thereof, thus forming a clearance for the pin 40 when the mirror is moved into vertical position.

A socket 58 supporting an incandescent light 59 is mounted on the lower wall of the reflector by means of a U-shaped support 60 and a conventional switch (not shown) within this socket is controlled by means of a vertical shaft 61 passing through a short stud 62 secured on the lower surface of the reflector, a thumb turn 63 being rigidly secured at the lower end of this shaft 61.

The inner surface of the rear wall or reflector 31 may, if desired, be given a high finish and accordingly it will be apparent that light from the lamp 59 is reflected from the inner mirror surface back to such surface 31 and the amount of light passing out of the housing is far greater than would be the case if no internal mirror surface were provided.

It will be apparent from the foregoing construction that either mirror surface may be used as desired and when the user wishes to reverse the mirror surface, he manually moves the mirror frame 39 on its supporting pivot pin 40 through an arc until it occupies the position shown in Fig. 3, at which time the mirror may be reversed by revolving the mirror structure on the pivot pin 40 through an arc of 180°.

It will further be apparent that many changes may be made in the construction of the foregoing embodiment without departing from the spirit of the invention. For instance, the base structure may be made in one piece and also, if desired, a ball joint for the mirror structure may be provided.

What I claim is:

1. A combined lamp and mirror structure comprising a substantially cylindrical housing which is open at one end, a lamp positioned within said housing, a base member and adjustable pivotal means for mounting the housing on the base member, a mirror structure comprising an annular frame of smaller diameter than the open end of the housing and a plurality of mirrors mounted therein back to back, one of such mirrors being a plane mirror and the other a magnifying mirror, and means for pivotally mounting said mirror structure substantially in the center of the open end of the housing, said means comprising a substantially cylindrical stud, a pivotal mounting for such stud adjacent to the open end of said housing comprising an elongated strip secured at one end thereof to the inner surface of the housing, the opposite end of the strip being curved to form a bearing member which encloses the stud, such bearing portion having an annular slot therein, the stud having a radially disposed aperture therein, a radially disposed pin rigidly carried by the mirror frame, the outer terminal thereof being positioned within said aperture in the stud, the bearing member having a central annular slot to receive the pin and permit rotative movement of the stud, and means for permitting rotative movement of the pin relative to the stud, whereby the mirror structure may be moved outwardly from the housing on the pivot afforded by the stud and may be rotated on the axis of the pin.

2. A combined lamp and mirror structure comprising a cylindrical housing which is open at one end, a lamp positioned within said housing, a base member formed with an upstanding portion and adjustable pivotal means for mounting the housing in the upstanding portion of the base member, a mirror structure comprising an annular frame of smaller diameter than the open end of the housing and a plane and a magnifying mirror mounted therein back to back and means for pivotally mounting said mirror structure substantially in the center of the open end of the housing to permit the mirror to be moved into and out of the housing and means for permitting rotative movement of the mirror on its pivotal mounting to cause one mirror surface or the other to be exposed, said means comprising a substantially cylindrical stud, a pivotal mounting for such stud adjacent to the open end of said housing comprising an elongated strip secured at one end thereof to the inner surface of the housing, the opposite end of the strip being curved to form a bearing member which encloses the stud, such bearing portion having an annular slot therein, the stud having a radially disposed aperture therein, a radially disposed pin rigidly carried by the mirror frame, the outer terminal thereof being positioned within said aperture and means for permitting rotative movement of the pin relative to the stud, whereby the mirror structure may be moved outwardly from the housing on the pivot afforded by the stud and may be rotated on the axis of the pin.

HARRY KONIKOFF.